Patented May 3, 1932

1,856,203

UNITED STATES PATENT OFFICE

HUGO WOLFF AND MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Application filed August 8, 1928, Serial No. 298,394, and in Germany August 18, 1927.

We have found that new valuable vat dyestuffs are obtained when the tetrahalogen-2.2'-dibenzanthronyls, prepared, for example, by halogenating 2.2'-dibenzanthronyl or its derivatives, are heated with aminoanthraquinones, preferably with the addition of alkaline or other substances adapted to combine with acids, and of compounds of copper or other metals. In this case it has been found that the reaction does not cease, as in the case of mono- and dihalogen-2.2'-dibenzanthronyls, with which the formation of the anthraquinoneamino-2.2'-dibenzanthronyls, have no tinctorial value, and do not become converted into dyestuffs until subsequently treated with alkalis, but that valuable vat dyestuffs are obtained at once in the form of deep violet to black powder, dissolving to a red or blue violet solution in concentrated sulfuric acid and dyeing cotton from a blue to violet vat black or violet shades probably corresponding to the formula:

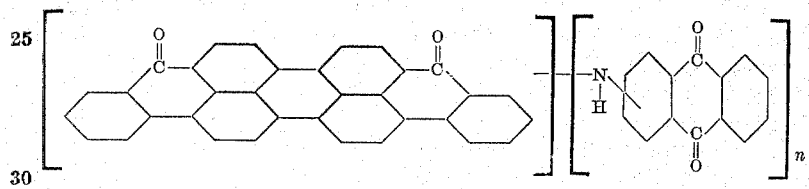

in which $n$ may be 1 to 3 and in which the dibenzanthrone and the anthraquinone radicle may be substituted.

The following examples will further illustrate the nature of the said invention which however is not limited thereto. The parts are by weight.

Example 1

10 parts of tetrabrom-2.2'-dibenzanthronyl prepared, for example, by brominating 2.2'-dibenzanthronyl in chlorsulfonic acid, or by introducing 2.2'-dibenzanthronyl into an excess of bromine, are heated to boiling with 6 parts of 1-aminoanthraquinone, 2 parts of soda ash, 0.2 part of cupric oxid and 200 parts of nitrobenzene, until the formation of the dyestuff is complete. After cooling to about 80° C., the product is filtered by suction, and is washed with warm nitrobenzene, alcohol and water. In this way, the dyestuff is obtained in the form of a black powder, which gives a red violet solution with concentrated sulfuric acid, and furnishes very fast black dyeings on vegetable fibres, from a blue vat. The amount of 1-aminoanthraquinone employed may be varied, smaller quantities furnishing a product which gives dyeings of a bluish cast, and larger quantities a product with a brownish tinge.

Example 2

10 parts of tetrabrom-2.2'-dibenzanthronyl are well mixed with 8 parts of 1-aminoanthraquinone, 2 parts of calcined soda and 0.3 part of cupric oxid, and heated for from 2 to 3 hours by means of a lead bath with a temperature of from 320° to 340° C. The originally viscous melt gradually becomes solid, and after cooling, is crushed, stirred with hot water, filtered and the product is dried. The resulting black dyestuff can be purified by extraction with solvents of high boiling point, and then forms a violet black powder, with very similar properties to those of the dyestuff of Example 1 and giving very fast black dyeings on vegetable fibres. As in Example 1, the amount of amine used may be varied, with the results therein stated.

Example 3

10 parts of tetrabrom-2.2'-dibenzanthronyl are boiled with 6.4 parts of 1-amino-4-methoxyanthraquinone, 2 parts of calcined soda and 0.3 part of cupric oxid in 150 parts of nitrobenzene until the presence of unaltered initial material can no longer be detected. After cooling to from about 60° to 80° C., the product is filtered by suction and washed with nitrobenzene in the usual way. A deep violet powder is obtained, which dissolves to a blue violet solution in concentrated sulfuric acid and on reprecipitation furnishes a black paste giving, with caustic soda solution and hydrosulfite, a blue violet vat, the dyeings from which, on vegetable fibres are of very fast and handsome blue black shades.

*Example 4*

10 parts of dibrom-6.6'-dichlor-2.2'-dibenzanthronyl, prepared by introducing 6.6'-dichlor-2.2'-dibenzanthronyl into an excess of bromine, are boiled for several hours with 6.5 parts of 1-aminoanthraquinone, 2 parts of calcined soda and 0.2 part of cupric oxid in 150 parts of nitrobenzene, until the formation of the dyestuff is complete. The reaction mixture is treated in the manner above described and the dyestuff is obtained as a violet brown crystalline powder which can be purified by boiling with nitrobenzene or other suitable solvent. The dyestuff dissolves in concentrated sulfuric acid, in the warm, to a violet brown solution, and gives blue black dyeings from a blue violet vat.

*Example 5*

10 parts of tetrabrom-2.2'-dibenzanthronyl are heated to boiling with 6 parts of 1.6-diaminoanthraquinone, 2 parts of calcined soda, 0.3 part of cupric oxid and 150 parts of nitrobenzene until the formation of the dyestuff ceases to increase. The melt is treated in the usual manner. The resulting dyestuff is a deep violet powder which dissolves to a violet solution in concentrated sulfuric acid. On the sulfuric solution being poured into water, a black paste is obtained, furnishing, with caustic soda solution and hydrosulfite, a blue vat which gives very fast greyish black dyeings on vegetable fibres.

*Example 6*

10 parts of tetrabrom-2.2'-dibenzanthronyl are intimately mixed with 8 parts of 2-aminoanthraquinone, 3 parts of calcined soda and 0.4 part of cupric oxid, and fused at from about 300° to 340° C. until the conversion is complete. After being triturated with water, the mass is filtered by suction, washed and dried. A violet black powder is obtained, which can be purified by extraction with solvents of high boiling point, such as nitrobenzene. The purified dyestuff dissolves to a brown violet solution in concentrated sulfuric acid and furnishes, with caustic soda solution and hydrosulfite, a brownish violet vat, from which fast greyish black dyeings are obtained on vegetable fibres.

The 2-aminoanthraquinone may be replaced with similar results, by its derivatives, such as 2-amino-3-chloranthraquinone.

*Example 7*

10 parts of tetrabrom-2.2'-dibenzanthronyl are intimately mixed with 8 parts of β-aminoalizarine, 3 parts of calcined soda and 0.4 part of cupric oxid, and fused for several hours at between 300° and 340° C., until the formation of the dyestuff is complete. After treating the product with hot water and boiling the resulting blackish brown powder with suitable solvents, a black powder is obtained which dissolves to a violet solution in concentrated sulfuric acid and furnishes, with caustic soda solution and hydrosulfite, a violet vat, from which vegetable fibres are dyed blue black shades. α-aminoalizarine may replace the β-aminoalizarine with similar results.

What we claim is:

1. A process of producing new vat dyestuffs which consists in condensing a tetrahalogen-2.2'-dibenzanthronyl with an amino-anthraquinone.

2. A process of producing new vat dyestuffs which consists in condensing a tetrahalogen-2.2'-dibenzanthronyl with an aminoanthraquinone and absorbing the acid formed during condensation by means of an acid-binding agent.

3. A process of producing new vat dyestuffs which consists in condensing a tetrahalogen-2.2'-dibenzanthronyl with an aminoanthraquinone in the presence of copper or copper oxide, and absorbing the acid formed during condensation by means of an acid-binding agent.

4. A process of producing new vat dyestuffs which consists in condensing tetrabrom-2.2'-dibenzanthronyl with an 1-aminoanthraquinone.

5. A process of producing new vat dyestuffs which consists in condensing tetrabrom-2.2'-dibenzanthronyl with 1-amino-4-methoxyanthraquinone.

6. As new articles of manufacture vat dyestuffs forming deep violet to black powders dissolving to from red to blue violet solutions in concentrated sulfuric acid, dyeing cotton from a blue to violet vat fast violet to black shades, as are obtainable by condensing a tetrahalogen-2.2'-dibenzanthronyl with an amino-anthraquinone.

7. As new articles of manufacture vat dyestuffs forming a deep violet to black powder dissolving to from red to blue violet solutions in concentrated sulfuric acid, dyeing cotton from a blue to blue violet vat blue-black to black shades, as are obtainable by condensing tetrabrom 2.2'-dibenzanthronyl with an 1-aminoanthraquinone.

8. As new articles of manufacture vat dyestuffs forming a deep violet powder dissolving to a blue violet solution in concentrated sulfuric acid, dyeing cotton from a blue violet vat blue-black shades, as are obtainable by condensing tetrabrom-2.2'-dibenzanthronyl with 1-amino-4-methoxyanthraquinone.

In testimony whereof we have hereunto set our hands.

HUGO WOLFF.
MAX ALBERT KUNZ.
KARL KOEBERLE.